(12) United States Patent
Menezes

(10) Patent No.: US 9,054,861 B2
(45) Date of Patent: Jun. 9, 2015

(54) ENHANCED KEY AGREEMENT AND TRANSPORT PROTOCOL

(75) Inventor: Alfred Menezes, Waterloo (CA)

(73) Assignee: Certicom Corp., Waterloo, Ontario (CA)

( * ) Notice: Subject to any disclaimer, the term of this patent is extended or adjusted under 35 U.S.C. 154(b) by 1936 days.

(21) Appl. No.: 11/452,393

(22) Filed: Jun. 14, 2006

(65) Prior Publication Data

US 2007/0033405 A1 Feb. 8, 2007

Related U.S. Application Data

(60) Provisional application No. 60/690,156, filed on Jun. 14, 2005.

(51) Int. Cl.
*H04L 9/00* (2006.01)
*H04L 9/08* (2006.01)

(52) U.S. Cl.
CPC .................................. *H04L 9/0844* (2013.01)

(58) Field of Classification Search
CPC .................................................... H04L 9/0844
USPC .............. 380/1, 255, 264, 277; 713/282, 289; 726/26, 27, 28, 29, 30
See application file for complete search history.

(56) References Cited

U.S. PATENT DOCUMENTS

| | | | |
|---|---|---|---|
| 2003/0123668 A1* | 7/2003 | Lambert et al. | 380/277 |
| 2003/0217258 A1* | 11/2003 | Bade | 713/150 |
| 2004/0010689 A1* | 1/2004 | Vanstone et al. | 713/171 |
| 2005/0039023 A1* | 2/2005 | Vanstone et al. | 713/180 |
| 2005/0084114 A1* | 4/2005 | Jung et al. | 380/278 |
| 2006/0026426 A1* | 2/2006 | Chen et al. | 713/168 |
| 2006/0105740 A1* | 5/2006 | Puranik | 455/410 |
| 2006/0179319 A1* | 8/2006 | Krawczyk | 713/180 |
| 2008/0175376 A1* | 7/2008 | Campagna et al. | 380/30 |

OTHER PUBLICATIONS

Krawczyk, Hugo; "HMQV: A High-Performance Secure Diffie-Hellman Protocol"; Jun. 13, 2005; Available from http://eprint.iacr.org/2005/176.

* cited by examiner

*Primary Examiner* — Brandon Hoffman
*Assistant Examiner* — Nega Woldemariam
(74) *Attorney, Agent, or Firm* — Rowand LLP

(57) ABSTRACT

A key agreement protocol for use in a public key cryptographic scheme between a pair of correspondents each of which has a long term public key and an ephemeral public key. The protocol includes the steps of exchanging the ephemeral public keys between the correspondents for computing a shared secret at each correspondent and utilizing the shared secret to obtain a common key, wherein the validity of the ephemeral public keys is checked by the recipient thereof prior to use of the common key.

19 Claims, 2 Drawing Sheets

ENHANCED KEY AGREEMENT AND TRANSPORT PROTOCOL

This application claims priority from U.S. Provisional Patent Application No. 60/690,156 filed on Jun. 14, 2005.

FIELD OF THE INVENTION

The present invention relates to data transmission systems and in particular systems for implementing key transportation and key agreement protocols within a public key infrastructure.

BACKGROUND OF THE INVENTION

Various protocols exist for establishing common keys between a pair of entities connected within a data communication system or for transporting keys between such entities. Many of theses protocols are based upon the fundamental Diffie-Hellman protocol in which a piece of information private to one of the correspondents is combined with public information from the other correspondent to arrive at a common key. The protocol known as the MQV protocol after the inventors Menezes, Qu and Vanstone and exemplified in the PCT application WO 98/18234, is recognized as one of the most efficient of known authenticated Diffie-Hellman protocols that use public key authentication. It is recognized as offering superior performance whilst inherently possessing excellent security properties. As a result, MQV has been widely standardized and has recently been chosen by the NSA as the key exchange mechanism underlying the next generation of cryptography to protect the United States government information.

Proposals have been made to modify the MQV protocol to implement a variation of the protocol. Whilst these proposals have been made to address what are perceived as potential flaws in the underlying MQV concept, further examination has shown that such flaws do not exist and that the proposed modifications, contrary to the assumptions made by the proponents, themselves introduce additional security risks.

It is therefore an object of the present invention to obviate or mitigate the above disadvantages.

In general terms, the present invention provides a key agreement protocol in which a signature component of one correspondent includes a hash of the public key of the one correspondent and the identity of the intended recipient. During the exchange of information, the validity of at least one of the public keys used in the exchange is determined. The resultant shared key may also be checked for its validity.

BRIEF DESCRIPTION OF THE DRAWINGS

An embodiment of the invention will now be described by way of example only with the reference to accompanying drawings in which.

DETAILED DESCRIPTION OF THE INVENTION

Figure 1:
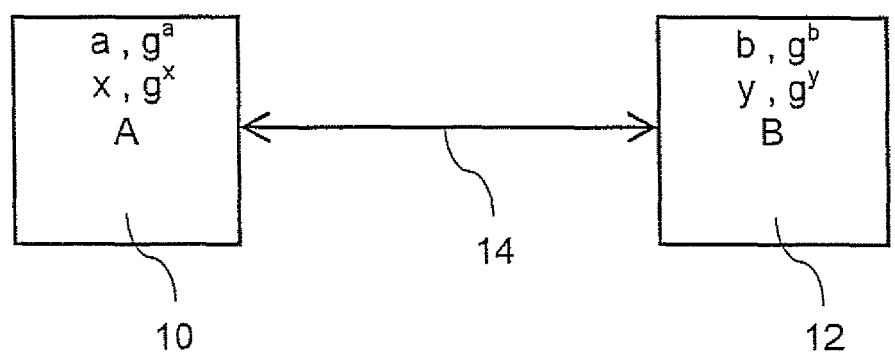
FIG. 1 is a schematic representation of a data communication system.
Figure 2:
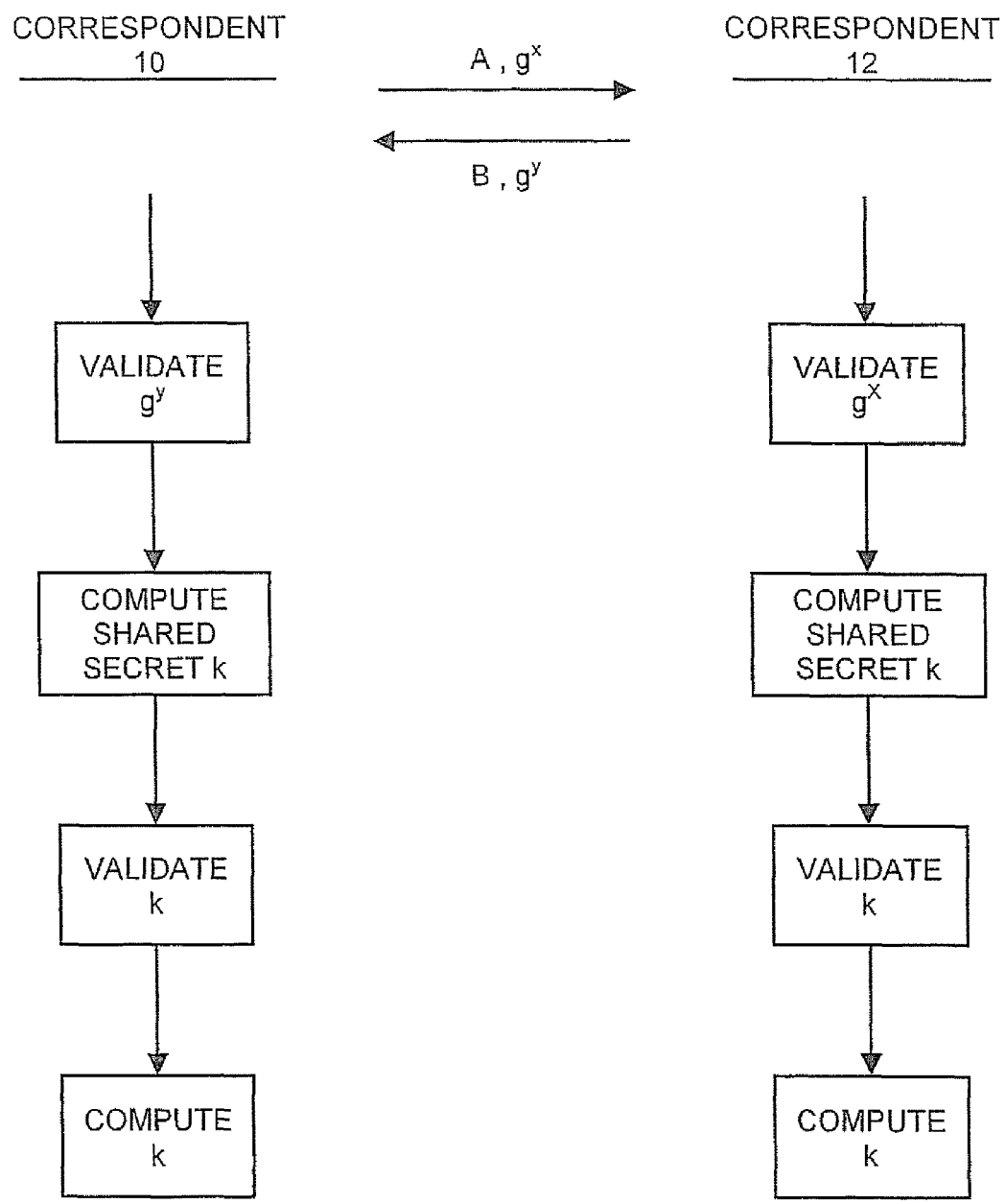
FIG. 2 is a flow chart showing the exchange of information between correspondents in the data communication system.

Referring therefore to FIG. 1 a pair of correspondents 10, 12 exchange information over a data communication link 14. Each of the correspondents implement a cryptographic protocol in a cryptographic unit 16, 18 embedded within the respective correspondents. The cryptographic protocol is a public key protocol key implemented over a finite field. Such protocols use the intractability of the discrete log problem to secure a private key even where the corresponding public is known. A particularly useful protocol is that based on the properties of an elliptic curve defined over a finite field.

An elliptic curve E is a set of points that satisfy the equation $y^2+a_1xy+a_3y=x^3+a_2x^2+a_4x+a_6$. The elements of a finite field that satisfy the equation of an elliptic curve, together with the point at infinity, define an elliptic curve group G. The group G may have subgroups S and the group G, or each subgroup S, as the case may be, has a generator g that will generate each element of the group or subgroup. The number of points in the group or subgroup is the order q of the group or subgroup. Certain types of curves will have a cofactor h, as explained more fully at page 114 of Guide to Elliptic curve Cryptography published by Springer under ISBN 0-387-95273-X. The domain parameters including underlying field F, the curve E, the group G or subgroup S and the generator g are all parameters of the protocol that are publically known.

Each of the correspondents 10, 12 have respective long term private keys a, b and corresponding public keys $g^a$, $g^b$ respectively. Each of the cryptographic unites 16, 18, of the correspondents 10, 12 is also capable of generating a random integer x, y respectively and computing a corresponding ephemeral or session public key $g^x$, $g^y$ respectively. The long term public keys $g^a$, $g^b$ are initially presented to a certifying authority. CA, who determines that they satisfy certain arithmetic properties to ensure that they may validly be used as public keys. In particular, the CA establishes that the long term public keys do not belong to a small group or subgroup of less than a predetermined order, referred to as a small subgroup check, and that the keys represent points on the curve E. By performing the substitution of an unsuitable key by an interloper to gain access to secret information is avoided.

As a first exchange in a session between the correspondents 10, 12, correspondent 10 forwards a message consisting of the identity of correspondent 10, A, and the ephemeral public key $g^x$. Similarly, the correspondent 12 forwards the message including the identity of correspondent 12, B and the ephemeral public key $g^y$.

Upon receipt of the ephemeral public keys, each correspondent 10, 12 utilizes the cryptographic unit 16, 18, to perform a public key validation within the correspondent to again check for the suitability of the received ephemeral public key. The validation again requires checking the point is on the curve E and that it is not part of a small subgroup. The small subgroup check may be performed for particular types of curve by exponentiating the key by the cofactor h and checking that the result does not correspond to the point at infinity.

Each of the correspondents then computes a signature component $s_A$ and $s_B$ of the form $s_A=x+aH(g^x, B)$ and $s_B=y+bH(g^y,A)$, where H is a cryptographically secure hash function.

A common shared secret is then computed at each correspondent with the correspondent 10 computing $$k=[(g^y(g^b)^{H(g^y,A)})]^{s_A}$$

and the correspondent 12 computing $$k=[(g^x(g^a)^{H(g^x,B)})]^{s_B}.$$

Finally, the secret key K is obtained by applying a suitable key derivation function F (for example a cryptographic hash function) to the shared secret k: K=F(k). The secret key K is computed by each of the correspondent and should be the same to permit exchange of further messages in a secure manner by utilisation of the common key K.

By performing public key validation on each of the public keys utilised, malicious attacks on the protocol may be thwarted and the integrity of the data exchange may be assured.

If an elliptic curve group is used for which the cofactor h is small, then public key validation of the exchanged public keys $g^x$ and $g^y$ can be sped up by omitting the expensive exponentiation associated with the small subgroup check that guarantees that the key K is in the main group of order q. Instead, the recipient simply checks that the received public key $g^x$, $g^y$ is a point on the curve (but not necessarily one in the group of order q). Then, the shared secret k is raised to the power of the (small) cofactor h, and the result is checked to ensure that it does not correspond to the point at infinity. This modified shared secret is then hashed to yield the secret key K.

In an alternative embodiment, validation of the shared secret key k is computed by an exponent of either $s_A$ mod q or $s_B$ mod q where q is the order of the group G. Thus correspondent 10 computes $$k = [(g^y (g^b)^{H(g^x, A)})]^{S_A \bmod q}$$

and correspondent 12 computes $$k = [(g^x (g^a)^{H(g^y, B)})]^{S_B \bmod q}$$

By reducing the exponent mod q, the bit length of the exponent is reduced and accordingly the computational efficiency increased. The shared secret k may then be checked for conformance with the required mathematical properties, e.g. by checking k≠∞ and then used to compute the shared key k.

What is claimed is:

1. A key agreement protocol for use in a public key cryptographic scheme utilizing a finite group G to exchange information between a pair of correspondents over a data communication link, each of which has a respective long term public key, a respective ephemeral public key, and respective identity information associated therewith, said protocol comprising:

exchanging said ephemeral public keys and said identity information between said correspondents;

each of said correspondents checking, within that correspondent, a validity of said ephemeral public key received from said other of said correspondents by confirming that said received ephemeral public key is a member of said finite group G that satisfies pre-selected criteria for use as a valid public key;

each of said correspondents applying a cryptographic operation to said exchanged ephemeral public keys and to said exchanged identity information of both said correspondents to compute a shared secret; and, utilizing said shared secret to obtain a common key.

2. The key agreement protocol according to claim 1 wherein said pre-selected criteria comprises that said ephemeral public keys are not members of a sub group of less than a predetermined number of elements.

3. The key agreement protocol according to claim 1 wherein said cryptographic scheme is an elliptic curve cryptosystem and each of said correspondents confirms that said received ephemeral public key is a point on the elliptic curve.

4. The key agreement protocol according to claim 1 further comprising:

exchanging a long term public key between said correspondents;

each of said correspondents checking, within that correspondent, a validity of said long term public key received from said other of said correspondents by confirming that said received long term public key is a member of said finite group G that satisfies pre-selected criteria for use as a valid public key; and, wherein said cryptographic operation is further applied to said exchanged long term public key to compute said shared secret.

5. The key agreement protocol according to claim 1 wherein each of said correspondents applies said cryptographic operation to compute a signature component to bind said received identity information and the private and public keys of said correspondent.

6. The key agreement protocol according to claim 5 wherein said shared secret is computed by each correspondent exponentiating said received long term public key and said received ephemeral public key with said signature component.

7. The key agreement protocol according to claim 6 wherein said signature component is reduced mod q where q is the order of the group utilized in the cryptographic scheme.

8. The key agreement protocol according to claim 6 wherein said shared secret is exponentiated by the cofactor of the elliptic curve group and the result compared to the point at infinity to validate the exchanged ephemeral public keys.

9. The key agreement protocol according to claim 1, further comprising the step of validating said shared secret.

10. A method of establishing a common key used by a correspondent in a public key cryptographic scheme with another correspondent, said public key cryptographic scheme utilizing a finite group G, each of the correspondents having a respective long term public key, a respective ephemeral public key, and respective identity information associated therewith, said method comprising:

said correspondent forwarding a correspondent ephemeral public key and correspondent identity information over a data communication link to said other correspondent;

said correspondent receiving an other correspondent ephemeral public key and an other correspondent identity information over said data communication link from said other correspondent;

said correspondent checking a validity of said received ephemeral public key within said correspondent to confirm that said received ephemeral public key is a member of said finite group G that satisfies pre-selected criteria for use as a valid public key;

said correspondent applying a cryptographic operation to compute a shared secret using said forwarded ephemeral key, said received ephemeral key, said forwarded identity information and said received identify information; and, said correspondent utilizing said shared secret to obtain said common key.

11. The method according to claim 10, wherein pre-selected criteria comprises that said received ephemeral public key is not a member of a sub group of less than a predetermined number of elements.

12. The method according to claim 10, wherein said cryptographic scheme is an elliptic curve cryptosystem utilizing a defined elliptic curve and said correspondent confirms that said received ephemeral public key is a point on said defined elliptic curve.

13. The method according to claim 10 further comprising:

said correspondent receiving an other correspondent long term public key over said data communication link from said other correspondent; and, said correspondent checking a validity of said received long term public key within said correspondent to confirm that said received long term public key is a member of said finite group G that satisfies pre-selected criteria for use as a valid public key;

wherein said correspondent applying said cryptographic operation to compute said shared secret further utilizes said received long term public key.

14. The method according to claim 10, wherein the correspondent applies said cryptographic operation to compute a signature component to bind the received identity information and the private and public keys of the correspondent.

15. The method according to claim 14 wherein said shared secret is computed by exponentiating said received long term public key and said received ephemeral public key with said signature component.

16. The method according to claim 15 wherein said signature component is reduced mod q where q is the order of the group utilized in the cryptographic scheme.

17. The method according to claim 15 wherein said shared secret is exponentiated by the cofactor of the elliptic curve group and the result compared to the point at infinity to validate the ephemeral public keys.

18. The method according to claim 10, further comprising the step of validating said shared secret prior to using said common key.

19. A communication device configured for communicating with another correspondent communication device over a data communication link, the communication device having a cryptographic unit, the cryptographic unit being configured to implement a method of establishing a common key shared with the other correspondent communication device in a public key cryptographic scheme, said public key cryptographic scheme utilizing a finite group G, each of the communication devices having a respective long term public key, a respective ephemeral public key, and respective identity information associated therewith, the cryptographic unit operative to:

forward a correspondent ephemeral public key and correspondent identity information over a data communication link to said other correspondent;

receive an other correspondent ephemeral public key and an other correspondent identity information over said data communication link from said other correspondent;

check a validity of said received ephemeral public key within said correspondent to confirm that said received ephemeral public key is a member of said finite group G that satisfies pre-selected criteria for use as a valid public key;

apply a cryptographic operation to compute a shared secret using said forwarded ephemeral key, said received ephemeral key, said forwarded identity information and said received identify information; and, utilize said shared secret to obtain said common key.

* * * * *